March 7, 1939.   W. H. FRANK ET AL   2,149,994
ELECTRICAL DISTRIBUTION SYSTEM
Original Filed Sept. 24, 1934   3 Sheets-Sheet 1
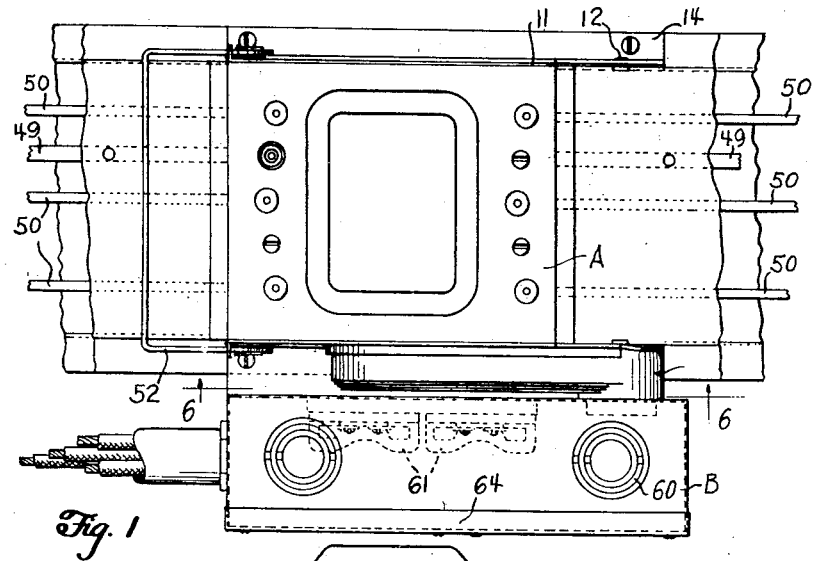
Fig. 1
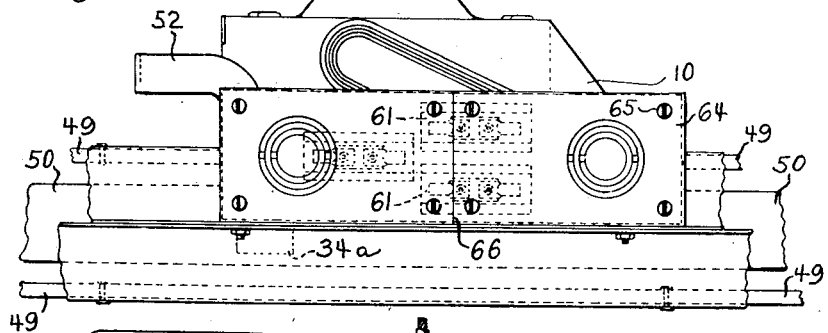
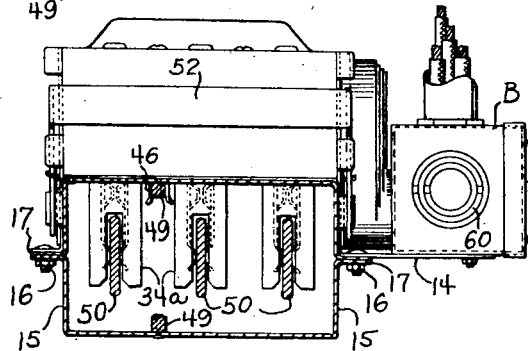
Fig. 2
Fig. 3
Inventor
W. H. Frank
Joseph W. Harper
By Daniel G. Cullen
Attorney

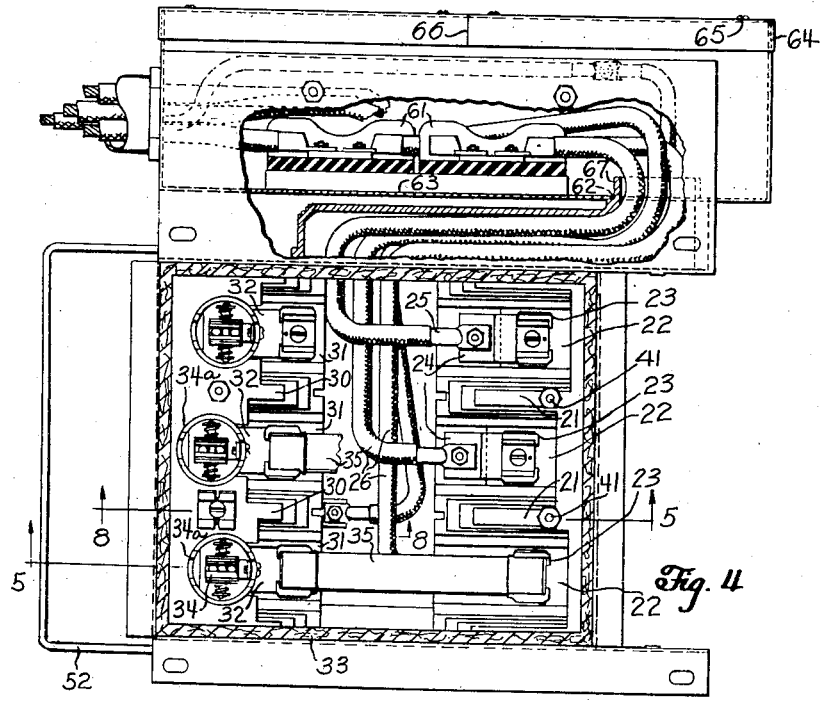
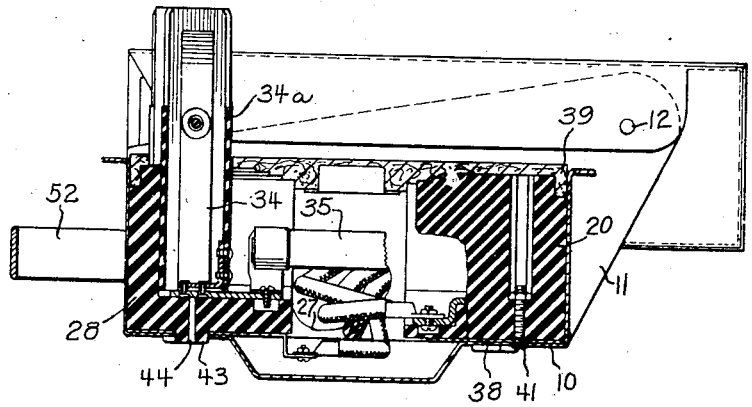

March 7, 1939. W. H. FRANK ET AL 2,149,994
ELECTRICAL DISTRIBUTION SYSTEM
Original Filed Sept. 24, 1934 3 Sheets-Sheet 3
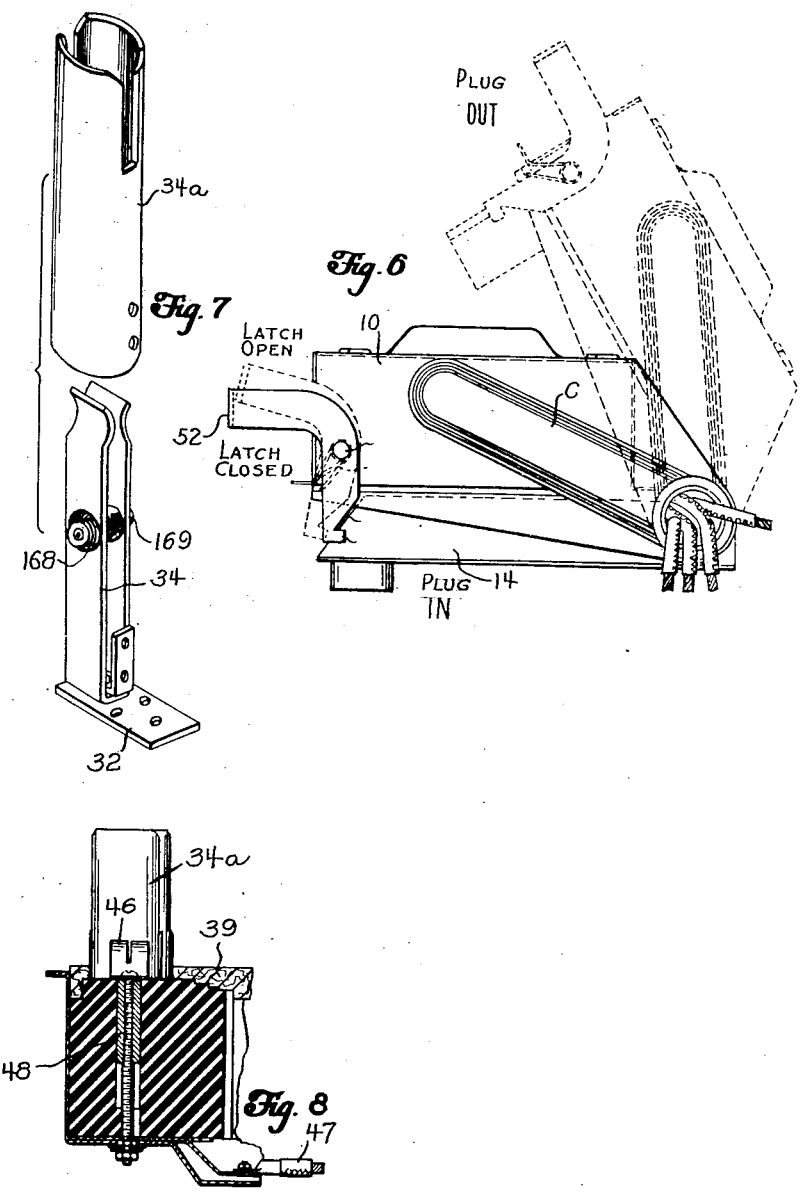
Inventor
W. H. Frank
Joseph. W. Harper.
By Daniel G. Cullen
Attorney Patented Mar. 7, 1939

2,149,994

UNITED STATES PATENT OFFICE 2,149,994

ELECTRICAL DISTRIBUTION SYSTEM

William H. Frank and Joseph W. Harper, Detroit, Mich.

Original application September 24, 1934, Serial No. 745,300. Divided and this application January 25, 1935, Serial No. 3,446

12 Claims. (Cl. 200—114)

This application relates to electrical distribution systems. It more particularly relates to a novel current take-off means used in connection with bus ducts of the character shown in our application, Serial No. 692,910, filed October 9, 1933, and our application Serial No. 735,743, filed July 18, 1934; and is a division of our application Serial No. 745,300, filed September 24, 1934.

The copending applications referred to have become respectively, Patents No. 2,041,675; No. 2,009,376 and 2,088,105.

The objects and features of the inventions of this case will be more specifically described in the claims forming part of this specification, for an understanding of which reference may be had to the appended drawings, which show an embodiment of these inventions. In these drawings, Figs. 1–8 show a system provided with a hinged form of current take-off device;

Fig. 1 shows the device in top plan view and in position upon a bus-duct;

Fig. 2 shows the device in side view;

Fig. 3 shows the device in left end view;

Fig. 4 is a cut-away bottom plan view of the device;

Fig. 5 is an elevational section view thereof as if on the broken line 5—5 of Fig. 4;

Fig. 6 shows the switching head proper, the terminal or branch circuit connection box being removed for purposes of clarity;

Fig. 7 is an exploded view of a contact of the head, together with its insulating and protecting tube; and Fig. 8 shows details of construction of a neutral bus bar contact, as if on the line 8—8 of Fig. 4.

In application No. 692,910 there is shown a system comprising bus duct run and branch take-off devices. Since the bus duct run of the system of this case is the same as that shown in No. 692,910, except as equipped with certain constructional details of application Serial No. 735,743, the bus duct run of this case will not now be shown, except in such fragments as are necessary to illustrate features of the branch take-off device here shown in detail. The bus duct run will, however, be considered as forming a part of the disclosure of this case, incorporated by reference from the above mentioned applications.

The systems under consideration comprise bus duct runs equipped with branch circuit take-off devices of various sorts and one of these devices will now be described in detail, with reference to its cooperation with the duct shown here, in Serial No. 692,910, and in Serial No. 735,743.

The instant form of device, which is one of the various forms of devices that may be used with the duct run to form the system, comprises three major parts, namely, a switching head A, a branch circuit connection or terminal box B, and a metal raceway C secured to the head and connecting the terminal box and the head in such a way that the head can be pivotally moved with respect to the terminal box.

The head comprises a sheet metal box 10 having an open bottom and having downwardly extending sides 11 which are pivotally connected by means of rivets 12 to side plates 14, which fit on opposite sides 15 of the duct and are bolted thereto by the bolts 16, which pass through the duct flanges 17 and connect the duct halves. The holes for these bolts 16 are so positioned with respect to uniformly spaced access holes or crescent shaped openings of the duct, through which contacts of the head may pass, that proper alignment of head contacts with the duct access holes is assured by tightening of the bolts 16.

Inside the head box, at one end, is a vitreous insulation connection block 20 having partitions 21 which divide it into cells 22 in which are received fuse clips 23 and connection straps 24. Connected to these straps are the terminals 25 of flexible cables or jumpers 26 which pass out of the sheet metal head box through an oval aperture 27 in the side of the head box. At the opposite end of the head box is a vitreous insulation contact block 28 having partitions 30 dividing it into cells 31, corresponding in number to the cells 22 of the connection block 20. The cells of the contact block receive connection straps 32 and fuse clips 33, and to the straps 32 are secured the bights of U-shaped contacts 34, each of which projects downwardly from the cell 31 in which it is disposed a considerable distance below the open bottom of the box, sufficient to permit the contact to engage and make contact with a bus bar in the duct when the head is positioned thereon. A slotted insulation tube 34a is disposed in a cylindrical hole in each cell 31 to surround each contact and to form a protective sheath for the latter, and is fixedly secured thereto. Fuses 35 are disposed in the box bridging the fuse clips 23 in the connection block and the fuse clips 33 in the contact block to complete the circuit from the contacts 34 to the cables 26.

The blocks 20 and 28 are protected from shock and from direct contact with the sheet metal box 10 by means of a felt liner 38 and a felt strip 39, the latter having an edge exposed at the bottom of the box to form a gasket for the box and complete the dust-proof closure effected by the head box when the latter is swung "in" towards the duct, for contact making.

Suitable means in the nature of screw fastenings 41 are provided to secure the connecting block 20 and contact block 28 to the head box and other screw fastenings are utilized to secure the connection straps 24 and 32 to the blocks 20 and 28. The blocks are further provided with bosses 43 projecting through holes in the top of the box 10 and these bosses have fine holes 44 therethrough which afford access from outside the head box to the connection straps 24 and 32 for the reception of fuse test leads.

When the head is to be used in connection with a duct having a neutral bus bar, the head is provided with a neutral contact jaw 46 disposed between a pair of contact shielding tubes 34a and mounted and connected to a flexible neutral cable 47 in the manner shown in Fig. 8 particularly, through a duplex screw and threaded sleeve arrangement referenced 48. The neutral jaw 46 engages the neutral bus 49 of the bus duct through a suitable aperture in the latter, in substantially the same manner that the contacts 34 of the head engage the bus bars 50 of the bus duct. It is proposed to provide neutral bus bars 49 on opposite sides of the duct so that when a head is mounted on the duct, the neutral jaw 46 may engage either of the two neutral bus bars depending upon which side of the symmetrical bus duct is used for the reception of the head.

For moving the head on its pivotal mountings and for latching the head "in", there is provided a bail type handle 52 pivotally connected to the sides 11 of the box 10 by means of the rivets 53 shown. The handle has hook-shaped ends 54 which engage lugs 55 bent out from the side plates 14 which are bolted to the duct and latch the head to the duct when the head is swung "in". When the head is to be swung "out" the handle 52 is grasped and first moved with respect to the head in opposition to the handle retaining spring 56, to unlatch the head and permit it to be moved "out", which movement is effected merely by continuing the pull on the handle 52 from above the duct.

The branch circuit connection or terminal box B is an oblong sheet metal box mounted on and secured by screws to one of the side plates 14, extended for this purpose. Its top, side, and end walls have knockouts 60 permitting cable entrance into the box from outside, and disposed within the box are connection blocks 61 which permit the terminals of branch cables admitted into the box to be connected to the blocks and in turn to the previously described flexible cables which have their terminals connected to these blocks and to the connection block 20 in the head, the flexible cables passing out of the terminal box through a hole 62 in its rear side wall 63 and then through the raceway C to the head. The side 64 of the terminal box is removably connected to the box by screws 65 and is scored at 66 to be divisible into halves and thus facilitate entrance into the box for connection purposes.

The raceway C is shown as a casting having an open side disposed against a side 11 of the box 10, and having a tubular end 67 received within the opening 62 in the rear side wall 63 of the terminal box B and held therein by a cotter pin or the like, whereby the raceway, and with it the hinged head to which it is attached by screws or the like, are pivotally movable with respect to the terminal box. The flexible cables 26 which connect the connection block 20 in the head to the connection blocks 61 in the terminal box pass through and lie in the raceway and enter the terminal box through the tubular end 67 of the raceway and the alined hole 62 of the terminal box and enter the box 10 through the oval opening 27 of the latter. The cables leave the raceway at the head pivot point, and the raceway hole 67 is concentric with this pivot point; this prevents undue flexing of the cables when the head is swung open; the wires are twisted, rather than sheared, on movement of the head.

We claim:

1. For use with an electrical distribution system of the type employing bus duct and branch circuit take off devices, a branch circuit take off device including an elongated switching head fixedly supported and pivotally mounted with respect to the duct and provided with a fuse parallel to the bus bars and a contact for engaging a duct bus bar when the head is swung into contact making position, the fuse being between the head contact and the head pivot, and a branch circuit conduit connection means stationarily mounted with respect to the duct and so equipped as to permit a branch circuit conduit to be stationarily connected thereto and thus to the system, and a branch circuit conductor connected to the end of the fuse most remote from the contact and to the branch load through the conduit and entering the head at and in line with the pivotal axis thereof, whereby swinging of the head will create a twisting stress only in the branch circuit conductor.

2. For use with an electrical distribution system of the type employing bust duct and branch circuit take off devices, a branch circuit take off device including a switching head fixedly supported and pivotally mounted with respect to the duct and provided with a contact for engaging a duct bus bar when the head is swung into contact making position, and a branch circuit conductor connected to the contact and entering the head at and in line with the pivotal axis thereof, whereby swinging of the head will create a twisting stress only in the branch circuit conductor.

3. For use with an electrical distribution system of the type employing bus duct and branch circuit take off devices, a branch circuit take off device including a switching head fixedly supported and pivotally mounted with respect to the duct and provided with a contact for engaging a duct bus bar when the head is swung into contact making position, and a branch circuit conductor rigidly connected with respect to the duct and having a flexible portion leading to and being connected to the contact.

4. For use with an electrical distribution system of the type employing bus duct and branch circuit take off devices, a branch circuit take off device including a switching head fixedly supported and pivotally mounted with respect to the duct and provided with a contact for engaging a duct bus bar when the head is swung into contact making position, and a branch circuit conductor rigidly connected with respect to the duct and having a flexible portion leading to and being connected to the contact and entering the head at and in line with the pivotal axis thereof, whereby swinging of the head will create a twisting stress only in the branch circuit conductor.

5. For use with an electrical distribution system of the type employing a bus bar containing casing and branch circuit take off devices, a branch circuit take off device including a switching head, means fixed to said casing and fixedly supporting and pivotally mounting the head outside the casing, the head being provided with a contact for engaging a duct bus bar when the head is swung into contact making position, and a branch circuit conductor connected to the contact and entering the head through the pivotal mounting therefor, whereby the head will swing around the conductor without shearing the latter.

6. For use with an electrical distribution system of the type employing a bus bar containing casing and branch circuit take off devices, a branch circuit take off device including a switching head, means fixed to said casing and fixedly supporting and pivotally mounting the head outside the casing, the head being provided with a contact for engaging a duct bus bar when the head is swung into contact making position, and a branch circuit conductor connected to the contact and entering the head through the pivotal mounting therefor, whereby the head will swing around the conductor without shearing the latter, the head having an open side exposing its interior inside of which is the connection between the conductor and the contact, the open side normally being closed by the duct and being exposed when the head is swung away from the duct.

7. For use with an electrical distribution system of the type employing a bus bar containing casing and branch circuit take off devices, a branch circuit take off device including a switching head, means fixed to said casing and fixedly supporting and pivotally mounting the head outside the casing, the head being provided with a contact for engaging a duct bus bar when the head is swung into contact making position, and a branch circuit conductor connected to the contact and entering the head, the head having an open side exposing its interior inside of which is the connection between the conductor and the contact, the open side normally being closed by the duct and being exposed when the head is swung away from the duct.

8. A distribution system including a bus bar conduit, and a branch outlet box hinged with relation thereto and having contacts adapted to engage the bus bars in the conduit.

9. A distribution system including a bus bar conduit, and a branch outlet box hinged with relation thereto and having contacts adapted to engage the bus bars in the conduit, the box containing binding means for branch conductor terminals entering the box, the contacts being connected to the binding means, by fuses within the box and arranged with their longitudinal axes parallel to the run of the conduit.

10. A distribution system including a bus bar conduit, and a branch outlet box hinged with relation thereto and having contacts adapted to engage the bus bars in the conduit, the box containing binding means for branch conductor terminals entering the box, on the swing axis of the box the contacts being connected to the binding means by fuses within the box and arranged with their longitudinal axes parallel to the run of the conduit.

11. In a bus duct distribution system, a stationary bus duct, a stationary part providing a conduit securing means, a conduit secured thereto, a contact body or plug hingedly connected to the stationary part, and arranged for swinging to and from the bus duct, branch conductors in said conduit and having terminals emerging from an end of the conduit, contacts on said plug for engaging bus bars in the bus duct, the contacts being electrically connected to the cable terminals, by fuses within the plug and arranged with their longitudinal axes parallel to the run of the duct.

12. A distribution system including a bus bar conduit, and a branch outlet box hinged with relation thereto, said conduit having therein stationary live parts, and said box having at one end thereof binding means, and at the other end and connected to the binding means contacts adapted to engage the stationary live parts of the conduit, and branch conductor terminals entering the box on the swing axis of the box and connected to the binding means.

WILLIAM H. FRANK.
JOSEPH W. HARPER.